US012098573B2

(12) United States Patent
O'Neil et al.

(10) Patent No.: US 12,098,573 B2
(45) Date of Patent: Sep. 24, 2024

(54) MOTORIZED AUTOMATIC DOOR OPENER

(71) Applicants: Karen O'Neil, Dunmore, WV (US); Paul Marganian, Dunmore, WV (US); Max O'Ganian, Dunmore, WV (US); William O'Ganian, Dunmore, WV (US); Duncan Sizemore, Marlinton, WV (US); Tristan Sizemore, Marlinton, WV (US); Florian Baudler, Aborvale, WV (US)

(72) Inventors: Karen O'Neil, Dunmore, WV (US); Paul Marganian, Dunmore, WV (US); Max O'Ganian, Dunmore, WV (US); William O'Ganian, Dunmore, WV (US); Duncan Sizemore, Marlinton, WV (US); Tristan Sizemore, Marlinton, WV (US); Florian Baudler, Aborvale, WV (US)

(73) Assignee: Radioactive Robotics VA, Dunmore, WV (US)

(*) Notice: Subject to any disclaimer, the term of this patent is extended or adjusted under 35 U.S.C. 154(b) by 632 days.

(21) Appl. No.: 17/356,058

(22) Filed: Jun. 23, 2021

(65) Prior Publication Data

US 2021/0396041 A1 Dec. 23, 2021

Related U.S. Application Data

(60) Provisional application No. 63/042,646, filed on Jun. 23, 2020.

(51) Int. Cl.
*E05B 1/00* (2006.01)
*E05B 47/00* (2006.01)

(52) U.S. Cl.
CPC ........ *E05B 1/0053* (2013.01); *E05B 47/0012* (2013.01)

(58) Field of Classification Search
CPC ........................... E05B 1/0053; E05B 47/0012
See application file for complete search history.

(56) References Cited

U.S. PATENT DOCUMENTS 6,609,738 B1 * 8/2003 Roth ..................... E05B 65/108 292/144
2021/0077651 A1 * 3/2021 Romo ....................... A61L 9/18
2022/0186543 A1 * 6/2022 Soderqvist ............. E05F 15/63

* cited by examiner

*Primary Examiner* — Zoheb S Imtiaz
(74) *Attorney, Agent, or Firm* — Remenick PLLC

(57) ABSTRACT

A door opener and a method of using the door opener is disclosed. The door opener comprises a housing, a door handle grabber extending from the housing and adapted to engage a door handle, and a motor coupled to the door handle grabber and adapted to rotate the door handle grabber.

12 Claims, 5 Drawing Sheets

MOTORIZED AUTOMATIC DOOR OPENER

REFERENCE TO RELATED APPLICATIONS

This application claims priority to U.S. Provisional Application No. 63/042,646, filed Jun. 23, 2020, and entitled "Motorized Automatic Door Opener," the entire disclosure of which is hereby incorporated herein by reference.

BACKGROUND

1. Field of the Invention

This invention is directed to door handle openers and methods for opening doors. Specifically, the invention is directed to systems and methods of automatically opening doors with a motorized device.

2. Description of the Background

Access to work areas and rooms should not depend on an individual's physical capabilities. Yet around the world there are at least 14,000 specialized radio frequency (RF) protected doors which cannot be opened by people in wheelchairs or with other physical disabilities Anechoic chambers and other radio frequency (RF) protected rooms are designed to keep internally generated radio waves inside the room, and externally generated radio waves out. These rooms are used to protect satellite and radio dishes from interference, prevent detection of the signals within a room, and prevent stray signals from entering a room. These RF-shielded typically rooms have heavy, complex doors which cannot be opened by people in wheelchairs or with other physical limitations.

Current solutions for opening doors by people with physical disabilities include hooks for pulling the door open and closed, electronic access buttons, and motion activated switches. For RF-shielded doors the hooks are not a viable solution because the doors handles require too much torque. The electronic solutions that currently exist also do not work as they are not designed to turn the complex door handles that are necessary for the shielded rooms. Additionally, these electronic solutions create their own radio waves, and the interference caused by those devices would eliminate the purpose of the RF-shielded rooms. As a result, currently people with disabilities have to rely on someone else to open and close the doors to the RF-shielded rooms, as there are no existing solutions to allow an individual with limited physical mobility to open the doors.

SUMMARY

The present invention overcomes the problems and disadvantages associated with current strategies and designs and provides new tools and methods for automatically opening doors.

An embodiment of the invention is directed to a door opener, comprising a housing, a door handle grabber extending from the housing and adapted to engage a door handle, and a motor coupled to the door handle grabber and adapted to rotate the door handle grabber.

In a preferred embodiment, the door opener further comprises a controller, wherein the controller determines the position of the door handle grabber and provides instructions to the motor to rotate the door handle grabber. Preferably, the housing is a cylindrical tube and the door handle grabber extends from an end of the cylindrical tube. The cylindrical tube preferably blocks RF signals from being emitted from within the housing. Preferably, the door opener further comprises a power supply. Preferably, the power supply is one of a wall plug and a battery.

The door opener preferably further comprises a mounting coupled to the housing, wherein the mounting is adapted to couple the housing to a wall. Preferably, the mounting is an accordion arm. In a preferred embodiment, the door handle grabber has at least two tines adapted to engage the door handle. The door opener preferably further comprises an activation device, wherein upon activating the device, the door opener automatically locks or unlocks the door handle.

Another embodiment of the invention is directed to a method of opening or closing a door. The method comprises the steps of extending a door opener from a stored location to a door handle, engaging the door handle with the door opener, activating the door opener to open or close the door, disengaging the door opener from the door handle, and returning the door opener to the stored location. The door opener comprises: a housing, a door handle grabber extending from the housing and adapted to engage the door handle, and a motor coupled to the door handle grabber and adapted to rotate the door handle grabber.

In a preferred embodiment, the door opener further comprises a controller and the controller determines the position of the door handle grabber and provides instructions to the motor to rotate the door handle grabber. Preferably, the housing is a cylindrical tube and the door handle grabber extends from an end of the cylindrical tube. The cylindrical tube preferably blocks RF signals from being emitted from within the housing.

Preferably, the door opener further comprises a power supply. The power supply is preferably one of a wall plug and a battery. In a preferred embodiment, the door opener further comprises a mounting coupled to the housing, wherein the mounting is adapted to couple the housing to a wall. Preferably, the mounting is an accordion arm. The door handle grabber preferably has at least two tines adapted to engage the door handle. In a preferred embodiment, the door opener further comprises an activation device, wherein upon activating the device, the door opener automatically locks or unlocks the door handle.

Other embodiments and advantages of the invention are set forth in part in the description, which follows, and in part, may be obvious from this description, or may be learned from the practice of the invention.

DESCRIPTION OF THE INVENTION

Figure 1A:
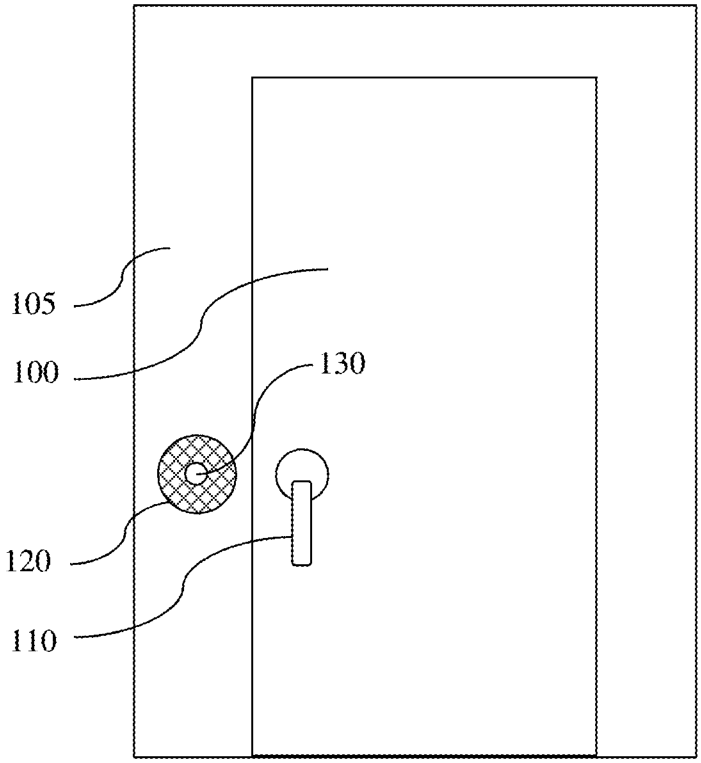
FIGS. 1A-D An embodiment of the steps of automatically opening a door.
Figure 1B:
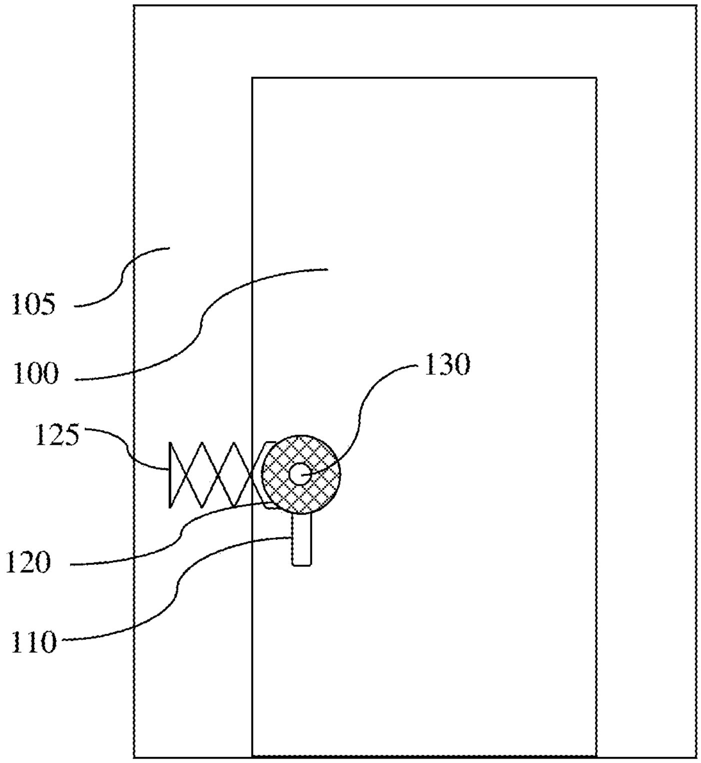

FIGS. 1A-D depict an embodiment of the steps of automatically opening a door 100 with a handle 110. While the system is described with a handle, the system can be used on other door opening mechanisms, such as latches, knobs, or levers. Additionally, the system may be used on door lock in addition to or in combination with door handles. As shown in FIG. 1A, preferably, a user approaches a closed door 100 with a handle 110 in the closed or locked position (pointing down in the figures). The door opener 120 is preferably attached to and stored against the door jam or wall 105. As shown in FIG. 1B, the user maneuvers door opener 120 from wall 105 onto handle 110. Door opener 120 may have an accordion or scissor arm 125, a telescoping arm, a multi-pivot arm, or another mechanism for extending the door opener 120 to handle 110. Preferably, accordion arm 125 is able to withstand the torque of rotating handle 110 (for example, 10, 12, 15, 18, 20, 25, or more foot-pounds of force). Preferably, door opener 120 is attached to wall 105 at the same height as handle 110, however in other embodiments, door opener 120 can be attached at another height, be attached to door 100, be free standing, or be attached to the floor or ceiling.

Figure 1C:
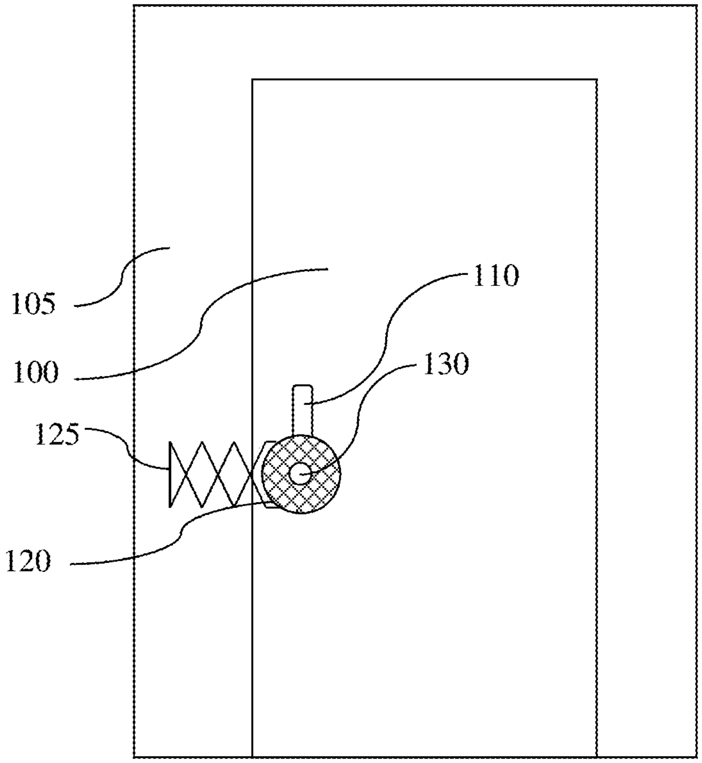
Figure 1D:
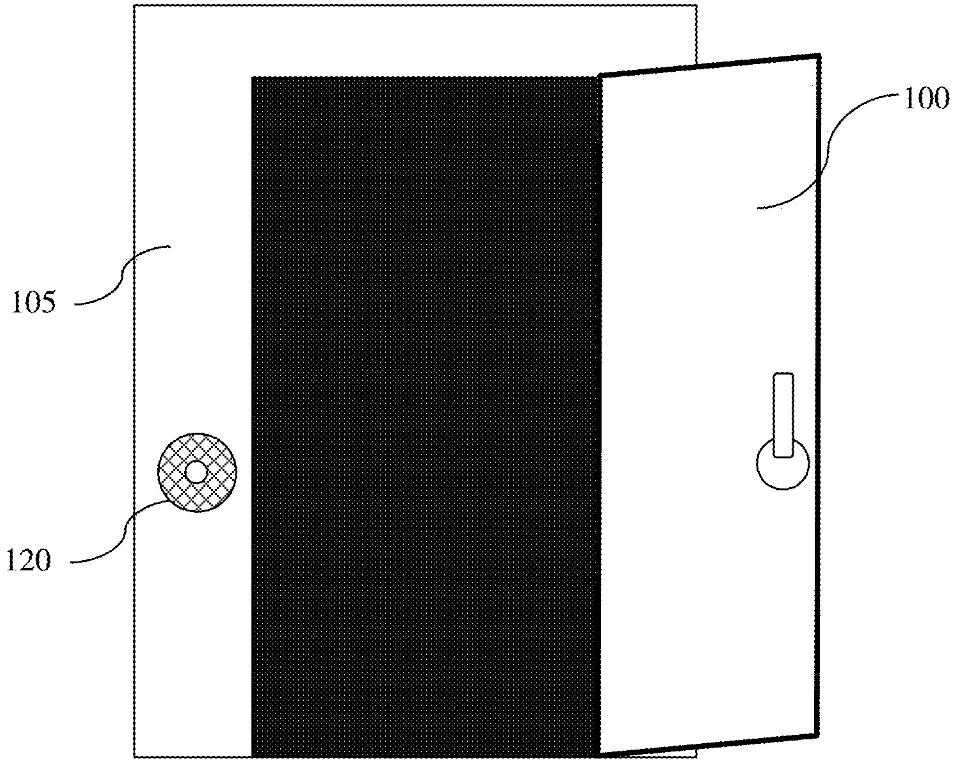

Once the user places door opener 120 over handle 110, the user preferably activates the door opener 120. Preferably, the activation is via button 130, however a switch, or another activation mechanism may be used. As shown in FIG. 1C, upon activation, door opener 120 rotates handle 110 to an open position (pointing up in the figures). Door opener 120 may be able to hold handle 110 in the open position (for example for spring loaded door levers) or handle 110 may stay in the open position. Once handle 110 is opened, door opener 120 is preferably returned to its storage location and door 100 can be opened, as shown in FIG. 1D. In order to lock or close a door, the above steps are repeated with door opener 120 rotating handle 110 from the open position to the locked or closed position. Each door 100 may have one door opener 120 on the either side of the door 100 so that the handle 110 may be opened and closed from both sides. Once unlatched, door 100 is able to be opened and closed with or without the aid of a door opening assistance device.

Figure 2:
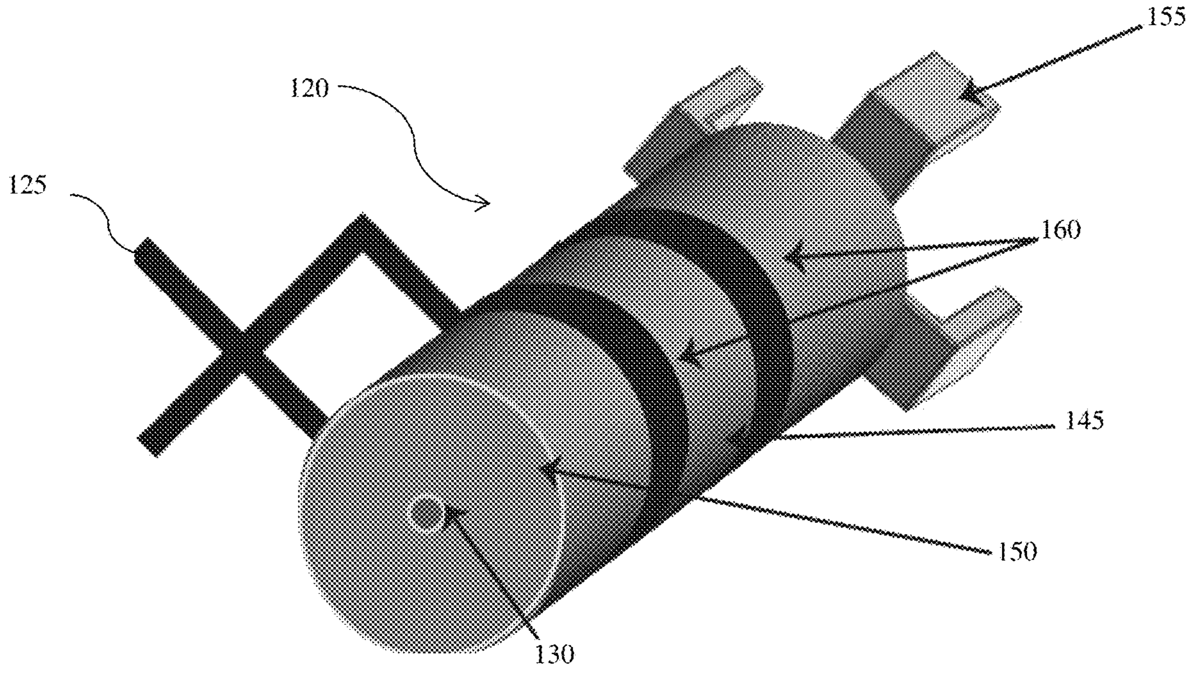
FIG. 2 A perspective view of an embodiment of a door opener.

FIG. 2 depicts a close up view of an embodiment of door opener 120. Door opener 120 preferably has a cylindrical housing 145 with a cap 150 at one end and a grabber 155 at the other end. In embodiments, where the door opener 120 is used in RF sensitive locations, a cylinder preferably provides the least amount of RF interference. The minimal seams in an extruded cylinder limit the amount of RF leakage from the device. However, in other, non-RF sensitive locations, other shapes may be utilized. Housing 145 is preferably made of metal to reduce RF interference, but can be made of plastic, carbon fiber, wood, or other manmade or naturally occurring materials. Cap 150 is preferably removable to allow for access to the inner components. Cap 150 may incorporate button 130 or button 130 may be located at another position on the housing. Grabber 155 preferably extends from the housing in order to engage a door handle. Additionally, straps 160 may be used to couple accordion arm 125 to housing 145. In other embodiments, screws, rivets, bolts, adhesive or another fastening device may be used.

Figure 3A:
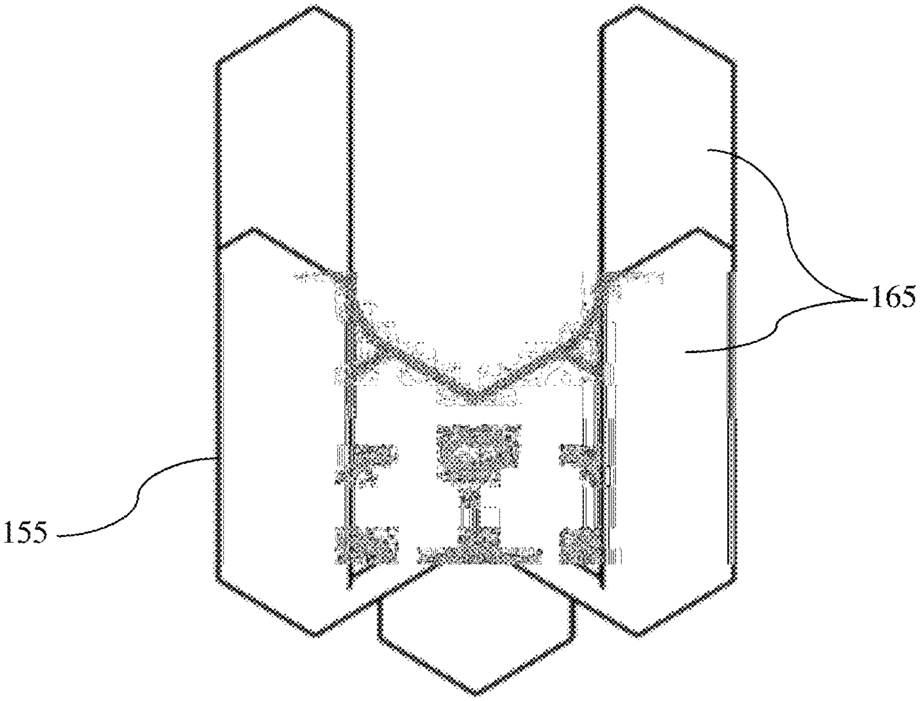
FIGS. 3A-B Perspective and front views of a grabber.
Figure 3B:
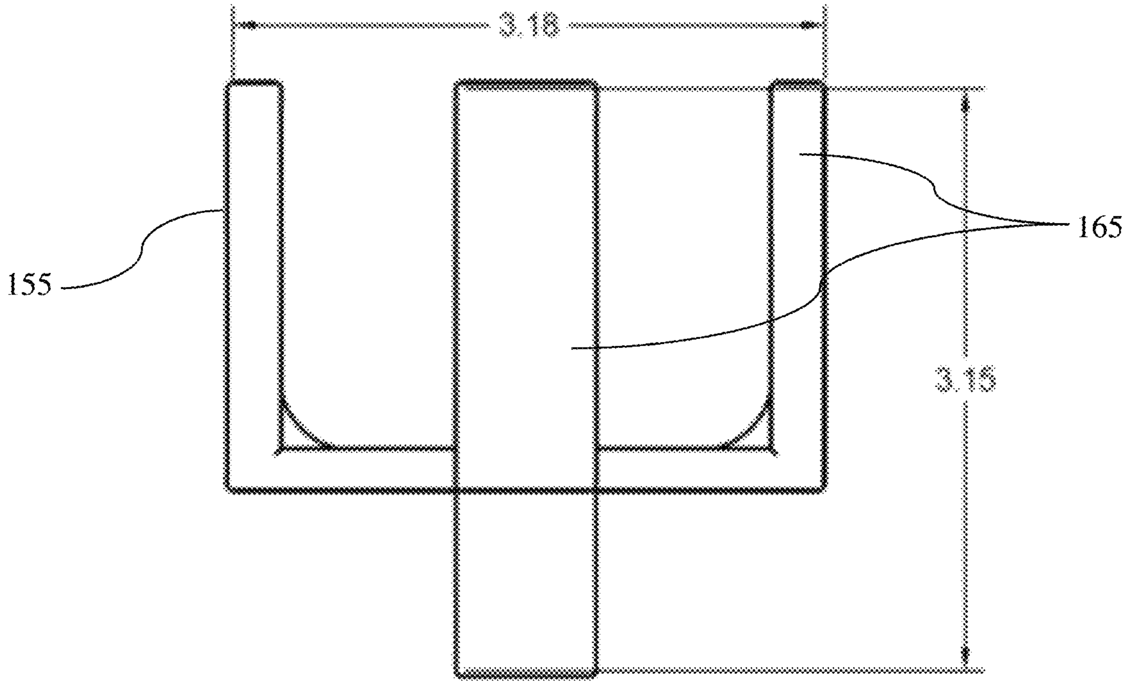

FIGS. 3A-B depict views of grabber 155. Graber 155 preferably has four tines or prongs 165 adapted to engage a door handle. In some embodiments, grabber 155 may have 2, 3, 5, 6, or more tines. Grabber 155 is preferably made of aluminum. However, Grabber 155 may be another metal, plastic, carbon fiber, wood, or other manmade or naturally occurring materials. Tines preferably are able to slide around a door handle, latch, or lever. In embodiments for use on a door knob, tines may be able to grip the door knob or otherwise engage the door knob. Preferably, grabber 155 can engage the door handle, latch, lever, or knob in any orientation.

Figure 4:
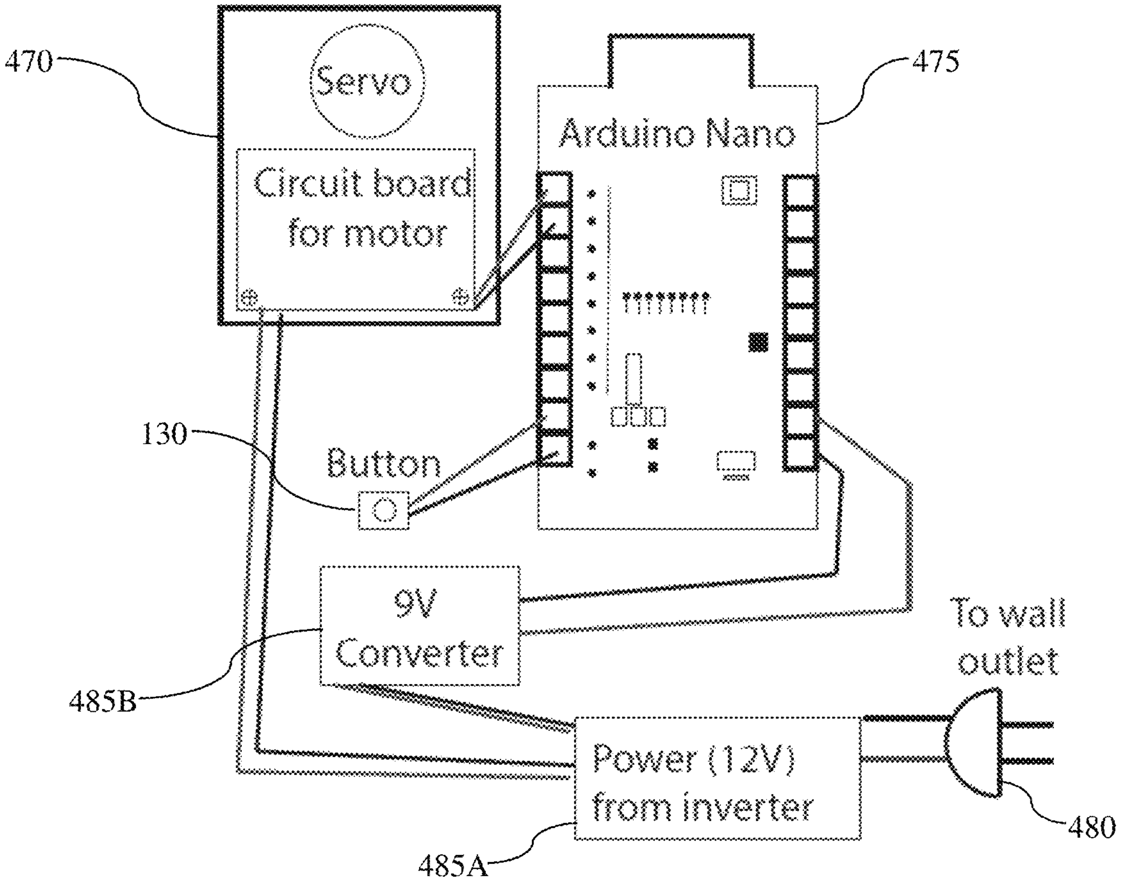
FIG. 4 An embodiment of the control components of a door opener.

FIG. 4 depicts an embodiment of the control components of door opener 120. Preferably, grabber 155 is rotated by motor 470. For example, motor 470 can be a servo motor, a stepper motor, a DC motor, or another device capable of turning grabber 155. Grabber 155 is preferably coupled to motor 470 by an axel or a direct connection. Motor 470 may be geared to increase or decrease torque or increase or decrease rotational speed. Preferably, motor 470 is controlled by a microcontroller (i.e. an Arduino) 475, circuit board, or another processing device. In other embodiments, motor 470 has an on/off switch, no microcontroller, and the user controls the rotation of grabber 155. Microcontroller 475 is preferably able to detect the current position of motor 470 and, when door opener 120 is activated via button 130, is able to direct grabber 155 to rotate in the direction necessary to open or close the door. For example, when the button is pushed, the device attempts to turn the door handle slightly. If the door handle rotates, the device continues to turn the door handle. If the door handle is unable to rotate (i.e. the device is rotating in the wrong direction), the device reverses the direction of rotation and turns the door handle the other way.

Both motor 470 and microcontroller 475 are preferably powered by power source 480. Power source 480 may be a conventional plug for a wall outlet, a rechargeable or non-rechargeable battery, a USB connection, solar powered, or another source of energy. Power source 480 may be coupled to electric conditioners 485A and 485B (i.e. power transformers, converters, or inverters) to provide the appropriate power to motor 470 and microcontroller 475.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. A door opener, comprising: a housing; a door handle grabber extending from the housing and adapted to engage a door handle; and a motor coupled to the door handle grabber and adapted to rotate the door handle grabber, wherein the housing is a cylindrical tube and the door handle grabber extends from an end of the cylindrical tube, wherein the cylindrical tube blocks RF signals from being emitted from within the housing, further comprising a mounting coupled to the housing, wherein the mounting is adapted to couple the housing to a wall, wherein the mounting is an accordion arm.

2. The door opener of claim 1, further comprising a controller, wherein the controller determines the position of the door handle grabber and provides instructions to the motor to rotate the door handle grabber.

3. The door opener of claim 1, further comprising a power supply.

4. The door opener of claim 3, wherein the power supply is one of a wall plug and a battery.

5. The door opener of claim 1, wherein the door handle grabber has at least two tines adapted to engage the door handle.

6. The door opener of claim 1, further comprising an activation device, wherein upon activating the device, the door opener automatically locks or unlocks the door handle.

7. A method of opening or closing a door, comprising:

extending a door opener from a stored location to a door handle;

engaging the door handle with the door opener;

activating the door opener to open or close the door;

disengaging the door opener from the door handle; and returning the door opener to the stored location;

wherein the door opener comprises:

a housing;

a door handle grabber extending from the housing and adapted to engage the door handle; and a motor coupled to the door handle grabber and adapted to rotate the door handle grabber;

wherein the housing is a cylindrical tube and the door handle grabber extends from an end of the cylindrical tube, wherein the cylindrical tube blocks RF signals from being emitted from within the housing, wherein the door opener further comprises a mounting coupled to the housing, wherein the mounting is adapted to couple the housing to a wall, wherein the mounting is an accordion arm.

8. The method claim 7, wherein the door opener further comprises a controller and the controller determines the position of the door handle grabber and provides instructions to the motor to rotate the door handle grabber.

9. The method claim 7, wherein the door opener further comprises a power supply.

10. The method of claim 9, wherein the power supply is one of a wall plug and a battery.

11. The method of claim 7, wherein the door handle grabber has at least two tines adapted to engage the door handle.

12. The method claim 7, wherein the door opener further comprises an activation device, wherein upon activating the device, the door opener automatically locks or unlocks the door handle.

* * * * *